Sept. 11, 1951  E. B. GREEN  2,567,429
DEVICE FOR APPLYING TIRE CHAINS
Filed Sept. 22, 1947
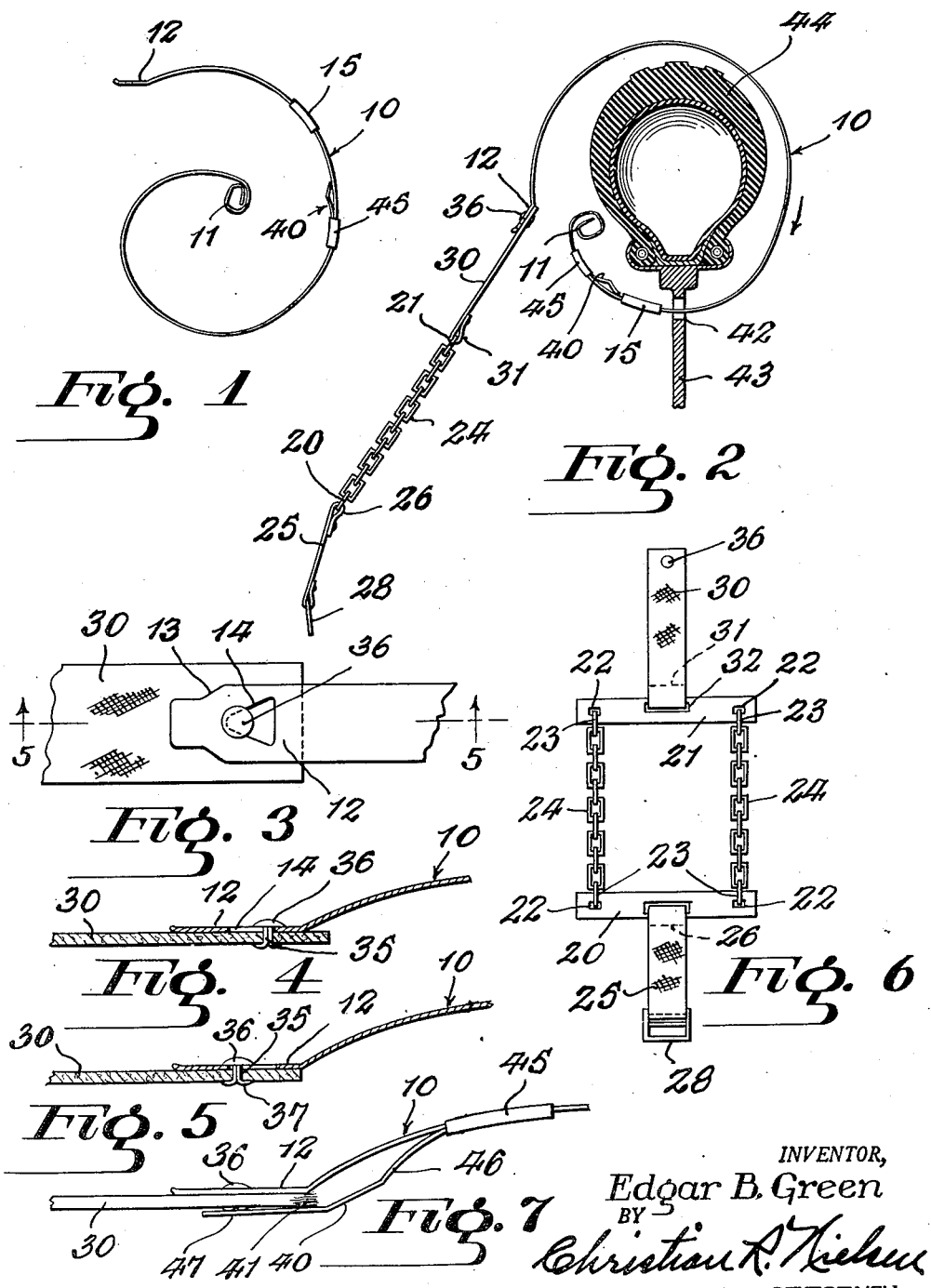
INVENTOR,
Edgar B. Green
BY
Christian R. Nielsen
ATTORNEY Patented Sept. 11, 1951

2,567,429

UNITED STATES PATENT OFFICE 2,567,429

DEVICE FOR APPLYING TIRE CHAINS

Edgar B. Green, Washington, D. C.

Application September 22, 1947, Serial No. 775,451

1 Claim. (Cl. 81—15.8)

This invention relates to a device for applying tire chains.

An object of the invention is the provision of a simple and efficient device for facilitating the application of individual chains to automobile tires in which a curved resilient strip of metal is provided with means for removably attaching one end of a connector strap on one end of the chain to the strip so when said strip is inserted through an opening in the wheel the strip may be employed for drawing the connector strap through the opening for engagement with a connector strap on the other end of the chain, said connector straps adapted to be fastened together for securing the chain on the tire.

Another object of the invention is the provision of a device for attaching an individual traction means to a tire while eliminating the usual troublesome work and inconvenience incidental to the application of the chain, said device being formed of a flexible strip of metal which is curved so that it may be inserted through an opening in the wheel and trained around a tire for attachment to one element of a separable fastener on one end of the chain, said element being drawn through the opening when the flexible strip is withdrawn from the opening, the other end of the chain having a complementary element of the separable fastener for attachment with the first mentioned element.

A further object of the invention is the provision of a device for aiding in applying an individual chain to a tire in which elements of a separable fastener projecting from the opposite end of the chain are employed for securing the chain in place, one of said elements of the fastener being in the form of a strap having a headed stud or pin, the device for applying the chain including a curved resilient strip of metal having an enlargement at one end and a substantially flat portion at the other end provided with a substantially triangularly shaped opening to receive the headed stud, said flat portion of the strip being inserted through an opening in a wheel for training the chain on the tire and for threading the element of the fastener carrying the headed stud through an opening in the wheel so that the elements may be connected together for securing the chain to the wheel.

The invention consists in the novel construction, arrangement and combinations of parts hereinafter more particularly described and claimed.

In the drawing:

Figure 1 is a plan view of a device for applying an individual chain to an automobile tire.

Figure 2 is a fragmentary transverse section of a vehicle wheel and tire showing my applicator in position for mounting a chain on a tire.

Figure 3 is a fragmentary plan view of one end of the device for applying the chain showing said end in operative relation with an element of a separable fastener on one end of an individual chain.

Figure 4 is a vertical longitudinal section of the connected members shown in Figure 3 and before the connection has been completed.

Figure 5 is a vertical longitudinal section taken along the line 5—5 of Figure 3 and showing the connection completed.

Figure 6 is a plan view of an individual tire chain which is to be applied to a tire, and Figure 7 is a fragmentary longitudinal side view of one end of the tire chain strip and a modified form of an associated end of the applicator.

Referring more particularly to the drawing, 10 designates a flat strip of resilient metal such as spring steel, the strip being bent into the form of a single convolution as shown in Figure 1. The inner end of the convolution is tightly coiled to provide an enlargement 11 for a purpose which will be presently explained.

The outer free end of the convolution has a portion 12 which is flat and which is bent outward or offset from the curved portion. The end of said flat portion is tapered as shown at 13 in Figure 3. The flat portion has a substantially triangular passage 14. The apices of the angles of the passage are made round.

There is a handle 15 in the form of a sleeve which may be adjusted manually along the curved strip from the flat portion 12 towards the enlargement 11 for the convenience of the operator when applying chains to different sized tires. For instance, when using the tool on truck tires the handle would be moved in the direction of the enlargement 11, so as to increase the operative length of the strip. The handle may be made of rubber or some composition material, as a synthetic plastic.

There are various forms of individual chains now on the market. One type of such chains is shown in Figure 6 and includes a pair of metal bars 20 and 21. Each bar is provided with a pair of spaced slots 22 for reception of a link 23 of a chain 24. These chains are in parallel relation.

A strap 25 which may be made of leather or a woven fabric has a loop 26 at one end received by a slot 27 in the bar 20 and has a buckle 28 at the other end. Said buckle is of the clamping type. A strap 30 has a loop 31 at one end received by a slot 32 in the bar 21. This strap is adapted to be received between the clamping elements of the buckle. The strap 30 and the buckle 28 are complementary to each other and constitute in effect, a separable fastener.

A stud or rivet 35 having a head 36 is split so that the free ends 37 of the split members may be swaged over against the inner face of the strap 30 as shown in Figures 4 and 5. The rivet or stud is secured in place when the head 36 rests on the flat portion 12 of the member 10 in order to provide the necessary space between the under face of the head and the upper surface of the strap 30 to receive the flat portion 12 when the stud has been inserted through the wide portion of the passage or opening 14.

In case the strap 30 may have become frayed at its end, a protective means generally designated by the numeral 40 is employed (Figure 7) for guiding the frayed end 41 of the strap 30 through an opening 42 in a disk 43 of an automobile wheel upon which the entire casing 44 is mounted. The protective means comprises a sleeve 45 received by and slidable on the member 10. A tongue 46 has one end secured to the sleeve while the free end 47 is flat and lies in close contact with the bottom face of the outer end of the strap 30 so that said end of the strap is seated neatly between the flat portion 12 of the member 10 and the free end 47 of the tongue. By this means, the frayed end of the strap may be drawn readily through the opening 42 of the disk 43 of the automobile wheel. The protective or guiding means 40 may be retained on the member 12 at all times when not in use since it will not interfere with the manipulation of said member 10 when a chain is being applied. The handle 15 of course, must be removed from the member 10 in order that the guide means may be moved to its operative position.

It will be noted that the rivet 35 is fixed in the strap 30 so as to present the head 36 upon the upper side of the strap and by reason of the offset in the portion 12 a proper connection between the member 10 and the strap 30 is insured.

The operation of my device is as follows: The flat tapered end 12 of the member 10 is inserted through the opening 42 of the disk 43 and brought around the tire casing 44 until the member 10 assumes the position shown in Figure 2. The enlargement 11 will prevent the member 10 from being withdrawn accidentally from the opening 42. The flat portion 12 is then placed upon the outer end of the strap 30 so that the head 36 on the stud or rivet 35 will be received by the broad end of the passage 14 and a pull is exerted on the member 10 until the rivet moves into the reduced end of said passage whence the members 12 and 30 will be firmly attached.

With the parts in these positions, the movement of the member 10 is reversed as shown by the arrow in Figure 2. During this operation, the member 10 is guided by the walls of the opening 42 in the disk 43 and by the curved surface of the casing 44. The chain is guided over the casing until it is draped thereon. The tapered flat portion 12 of the member 10 draws the strap 30 through the opening 42 so that it is in a position to be received by the buckle 28. The strap 30 is drawn taut until it is firmly gripped by the buckle.

The slots or opening 42 in the disk wheels of certain type of automobiles are relatively narrow and are thus difficult to thread with the straps 30. The member 10 is a thin strap of flexible metal which may be inserted into and drawn through the slots with ease. Furthermore, it is unnecessary for the operator to assume an uncomfortable position when applying the member 10 because the tapered end 12 may be inserted from the outer face of the wheel. The particular curvature of the member 10 will guide the end 12 around the casing 44 and will project the same exteriorly of the wheel for the application of the stud 35 on the strap 30 to the passage 14. The particular configuration of the passage 14 facilitates the application of the stud and head 36 to the flat portion 12 of the member 10.

I claim:

A device for applying individual chains to a casing of a vehicle wheel comprising a strip of resilient metal curved to form substantially a single convolution, one end of the strip having an enlargement to limit movement of the strip through a passage in a disk wheel of a vehicle, the other end of the strip having a flat offset portion provided with a triangularly shaped passage to receive a headed stud fixed to a strap on one end of an individual tire chain and a tubular operating handle slidable on the strip.

EDGAR B. GREEN.

REFERENCES CITED

The following references are of record in the file of this patent:

UNITED STATES PATENTS

| Number | Name | Date |
|---|---|---|
| 419,635 | Butts | Jan. 21, 1890 |
| 432,928 | Bartlett | July 22, 1890 |
| 1,665,150 | Watson | Apr. 3, 1928 |
| 2,257,657 | Spahr | Sept. 30, 1941 |
| 2,293,545 | Hewel | Aug. 18, 1942 |
| 2,293,650 | Hudson | Aug. 18, 1942 |
| 2,328,680 | Royer | Sept. 7, 1943 |
| 2,438,547 | Doebert | Mar. 30, 1948 |